G. P. HAYNES.
SHAFT COUPLING.
APPLICATION FILED JAN. 20, 1914.
1,147,240.
Patented July 20, 1915.
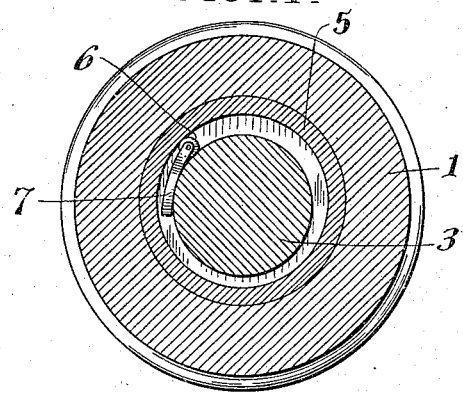
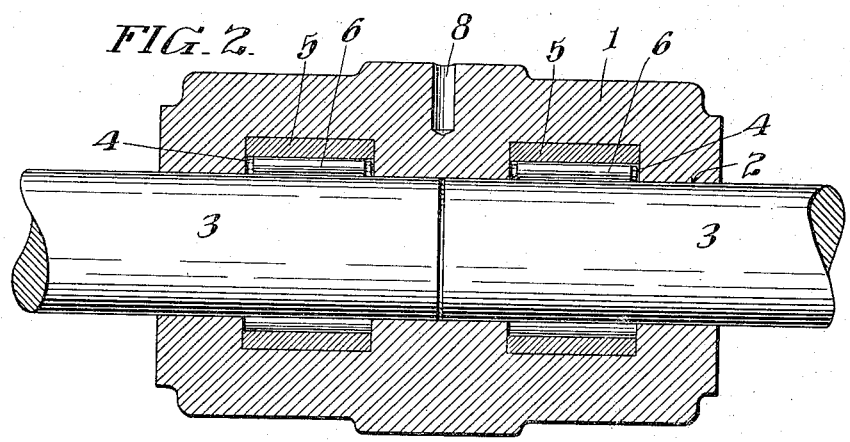
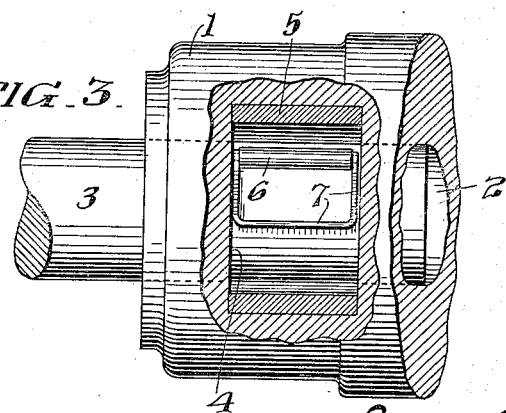
Witnesses
Daniel Webster, Jr.
C. H. Wissmann
Inventor
George P. Haynes
By 
Attorney

UNITED STATES PATENT OFFICE.

GEORGE P. HAYNES, OF JERSEY CITY, NEW JERSEY, ASSIGNOR TO PATTERSON-ALLEN ENGINEERING COMPANY, A CORPORATION OF NEW YORK.

SHAFT-COUPLING.

1,147,240.  Specification of Letters Patent.  Patented July 20, 1915.

Application filed January 20, 1914. Serial No. 813,204.

*To all whom it may concern:*

Be it known that I, GEORGE P. HAYNES, citizen of the United States, and resident of Jersey City, county of Hudson and State of New Jersey, have invented an Improvement in Shaft-Couplings, of which the following is a specification.

This invention relates to shaft-couplings and has for an object to provide a coupling which may be readily positioned upon the abutting ends of two alined shafts or the adjacent ends of a broken shaft, for the purpose of transmitting motion from one shaft or section thereof to another, without requiring specially adjustable devices having screws or bolts for permanently securing the coupling in operative position.

It has for a further object to provide a coupling which when placed in position will automatically grip the ends of the shafts to which it is secured and cause power to be transmitted from one shaft to another, or from one section of a broken shaft to the other section thereof.

It has for a further object to provide a coupling body with means including a friction roller which acts in conjunction with certain surfaces of the body, eccentric with respect to the shaft, for locking the roller carrying part or body to the shaft.

It has for a further object to provide a means for maintaining the roller above referred to in definite relation with respect to the shaft so that the parts are always positioned in operative condition.

My invention consists of novel features of construction, all as will be hereinafter fully set forth.

For the purpose of illustrating my invention, I have shown in the accompanying drawings one form thereof which is at present preferred by me, as the same has been found in practice to give satisfactory and reliable results, but it is to be understood, that the construction of the instrumentalities of which my invention consists may be variously arranged and organized and that my invention is not limited to the precise arrangement and organization of these instrumentalities as herein shown and described.

Referring to the drawings: Figure 1 represents a transverse section of a coupling embodying my invention; Fig. 2 represents a longitudinal section of the same; and Fig. 3 represents a side elevation of a portion of the coupling having certain parts broken away to more clearly show the internal construction.

Similar numerals of reference indicate like parts.

1 designates the coupling sleeve or body which is preferably of cast metal and has a longitudinal bore 2 therein to receive the alined ends 3 of two shafts which are to be coupled, or ends of two sections of a broken shaft, as will be readily understood. Intermediate the middle portion of the sleeve 1 and the respective ends thereof there is a chamber 4 of general cylindrical contour, each chamber having its axis preferably eccentric with respect to the axis of rotation of the shafts 3, the function of which construction will appear in the description of the adjuncts contained within the respective chambers.

5 designates bushings of hard metal, preferably of steel, which are respectively located in the chambers 4 and are properly located by casting the metal of the sleeve about them so that each normally provides a properly located bearing for the roller friction members which will now be described. In each of the chambers, and also within the bushings 5 there is a cylindrical roller 6, the diameter of which is substantially greater than the shortest radius of eccentricity, but substantially less than the longest radius of eccentricity, so that when the said roller occupies that portion of the space between the sleeve 5 and the shaft 3 which corresponds to the longer radius of eccentricity, the said roller will be freely movable and thus permit free relative movement between the shaft and the sleeve, but on the other hand, when the roller 6 moves toward or within the space corresponding to the shorter radius of eccentricity, it will contact with both the shaft 3 and the sleeve 5, thus creating a binding or gripping action which causes movement of the shaft to be transmitted directly to the sleeve.

While I have described above the action of one of the rollers it will be understood that the construction and operation of the roller for the other chamber is identical and consequently when both rollers are in frictional engagement with the parts between which they are located, movement transmitted from one shaft to the sleeve will in turn be transmitted from the sleeve to the other shaft. In this manner two shafts may be effectively coupled together and transmit movement from one to the other without the aid of bolted clamping devices or fastening means employing screws and similar objectionable parts which serve to permanently secure the shafts together, as it will be apparent that, in my construction, the sleeve may be readily slipped over the end of one shaft and then brought into proper relation with the alined opposite shaft and the coupling may then automatically couple the two shafts as soon as one or the other of said shafts begins to rotate. Furthermore in my present construction it will be apparent that should the rotation of the shaft be suddenly reversed while in operation, the shock due to this action will be materially reduced and excessive torsional strain eliminated, since the coupling will automatically release and then automatically engage the shaft again for the reverse movement. In order that the said rollers 6 may always be maintained with their axes substantially parallel to the shafts 3, I have preferably provided for each a U-shaped trailer or guard 7, the sides of which are arranged substantially parallel to and in close proximity to the radial side walls of the ends of the respective chambers 4. In this way any tendency of the roller to assume a position other than the correct operative one will be overcome by the contact of the sides of the guard with the end walls of the chamber. It will further be noted that the guards 7 are pivotally attached to the respective rollers 6 so that each member is freely movable with respect to the other and may perform its function without interference.

8 designates a socket formed in the sleeve 1 for inserting a suitable rod or implement for manually turning the sleeve to bring the parts into binding engagement preliminary to throwing on the power to rotate the driving shaft. It will of course be understood that the coupling may be manually rotated in the direction to cause an initial binding action upon the shaft, which is continued by the rotation of the shaft.

In the operation of the device, the coupling is placed in position by slipping it over the ends of the alined abutting shafts so that the abutting ends are received within the middle part of the bore 2 and the widest portion of the eccentric space between the shafts and the sleeves 5 is at the lower portion of the coupling. The rollers 6 may take a corresponding lowermost position so that the sleeve is freely movable longitudinally of the shafts for positioning it. A suitable implement is now inserted in the socket 8 and the coupling turned to bring one of the rollers into contacting with the driving shaft and by which rotation is imparted to the sleeve, and then the rotation of the sleeve will put the other roller into frictional contact with the driven shaft, so that the following continued rotation of the driving shaft will cause the proper continued binding of the parts, and the motion be thereby transmitted to the driven shaft.

It will now be apparent that I have devised a complete unitary coupling device wherein the motion of one shaft is transmitted promptly and positively to an adjacent shaft without excessive strains upon either the coupling or its adjuncts. I particularly direct attention to the hard metal or steel bushings or parts 5 which are cast with the sleeve 1 and form bearing surfaces capable of resisting wear and insuring long life to the coupling. While I have stated that these bushings are preferably of steel they may of course be formed of any hard metal suitable to resist wear and provide the desired friction surface. By making the bushings of steel, the high melting point thereof will enable the cast iron to be cast about the bushings without injury thereto, and at the same time will cheaply and accurately position said bushings in fixed position within the sleeve.

By employing steel for the bushings they may be tempered after the sleeves have been cast upon them by immersing in water or oil; and as all finishing of said bushings has been done before they are placed in the mold flask there is practically no machine work required except to broach or ream out the hole 2 through the cast iron sleeve. As the bushings may be made from steel tubing cut into short lengths, it is evident that the use of such bushings is inexpensive and provides a far more effective surface than could be secured by the cast metal cored surface. As the roller 6 and the shafts 3 are of steel, as well as the bushings, it is evident that I have the most effective gripping conditions. Furthermore, the trailer or guard 7 serves to maintain each roller correctly positioned with respect to its shaft by providing a means to prevent the rollers from assuming an angular position.

It will now be apparent that I have devised a novel and useful construction which embodies the features of advantage enumerated as desirable in the statement of the invention and in the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages; for example, the bushing need not be continued all the way around the axis of the coupling as it may be continued only within the reasonable limits of the clamping and releasing movements of the roller, and the guiding means for the roller may be of any other suitable construction so long as it keeps the axial alinement of the roller parallel to the axis of the shaft and coupling sleeve.

Having thus described my invention, what I claim and desire to protect by Letters Patent is:—

In a shaft coupling, a cast metal sleeve provided with a longitudinal bore adapted to directly receive the abutting ends of two shafts and also having a cylindrical chamber adjacent each end thereof and of a diameter greater than the diameter of the longitudinal bore and the end walls of said chambers being radial with respect to said bore, an annular steel bushing in each chamber having fixed contact with said cast metal sleeve and having an inner circumferential surface eccentrically arranged with respect to said bore, said bushings being of uniform internal shape in cross section throughout their length and out of contact with the respective shafts, and a roller loosely mounted within each chamber and adapted to frictionally engage the inner surface of the bushing and the outer surface of a shaft positioned in said bore.

In testimony of which invention, I hereunto set my hand.

GEORGE P. HAYNES.

Witnesses:
R. M. HUNTER,
E. W. SMITH.

Copies of this patent may be obtained for five cents each, by addressing the "Commissioner of Patents, Washington, D. C."